May 23, 1967 R. W. WHITMAN 3,321,566
SEMI-DULL NYLON YARN AND THE PROCESS OF MAKING IT
Filed Jan. 3, 1966 3 Sheets-Sheet 1

% TiO₂    SURFACE CHARACTERISTICS OF SPLIT-PROCESS YARN
        4,000X      8,000X      16,000X 0.02

0.30

0.50

0.90

% TiO₂ — SURFACE CHARACTERISTICS OF COUPLED-PROCESS YARN
4,000X   8,000X   16,000X 0.02

0.30

0.50

0.90

3,321,566
SEMI-DULL NYLON YARN AND THE PROCESS OF MAKING IT

Robert Wesley Whitman, Seaford, Del., assignor to E. I. du Pont de Nemours and Company, Wilmington, Del., a corporation of Delaware
Filed Jan. 3, 1966, Ser. No. 525,006
4 Claims. (Cl. 264—210)

This application is a continuation-in-part of U.S. application Ser. No. 334,802, filed Dec. 31, 1963, and application Ser. No. 253,034, filed Jan. 22, 1963, and both now abandoned.

This invention relates to an improved nylon yarn and a process for producing it.

Commercially available nylon yarn is usually produced by melt-spinning polyamide filaments, winding the undrawn yarn onto a package, and subsequently drawing the yarn. Due to separation of the spinning and drawing steps, this practice may be termed a "split" process. The continuing need for increased yarn production at decreased cost has led to the development of processes wherein the spinning and drawing steps are operated continuously, i.e., are not separated by an intermediate packaging step. Such an operation is termed a "coupled" process. Split process yarn is conventionally steamed before packaging as described in U.S. Patent No. 2,289,860; with coupled process yarn this is unnecessary.

Yarn produced by the economically more feasible coupled process has been found, however, to have certain disadvantages, namely: an increase in the streaking of fabrics woven from yarn so produced. Attempts to elleviate the problem of fabric streakiness must not interfere with the well-known high standards of mechanical quality, uniformity, and freedom from color which have been set for commercial nylon yarns.

One important aspect of uniformity is the level of luster, which level is customarily controlled in polyamide yarns comprised of filaments of round cross-section by adding specified amounts of a delusterant, usually titanium dioxide ($TiO_2$). The trade has become accustomed to accepting round filament, nylon yarn in three standard luster categories, "bright," "semi-dull," and "dull." It should be noted that "luster" combines the aspects of "opacity" and "sheen." Yarns departing from the appearance expected in these standard categories cannot be tolerated if they are to be freely mixed in fabrics with other fibers of the same category. It is therefore incumbent upon the yarn manufacturer to maintain product uniformity so that all yarns of a specified luster category are "interchangeable." In this regard, the split-process nylon yarn of the semi-dull variety contains about 0.3% titanium dioxide. Some variation in the concentration of titanium dioxide can be tolerated, but the range of variation is limited by the need to maintain uniformity to the eye, aggravated by the fact that a chalky appearance is imparted to split-process yarn if this narrow range is exceeded.

It is, therefore, the object of this invention to provide a method for making a yarn by a coupled process which will be substantially streak-free in woven fabrics, yet remain interchangeable with standard semi-dull yarn (0.3% $TiO_2$).

In accordance with the present invention, a semi-dull fiber-forming nylon having at least one filament of round cross-section is prepared from polyhexamethylene adipamide by a process which comprises (1) adding from about 0.5 to about 0.75 weight percent $TiO_2$ to partially polymerized polyhexamethylene adipamide, (2) extruding the molten polymer from a spinneret to form a yarn having at least one filament of round cross-section, (3) quenching the molten filament by exposure to air, and (4) substantially immediately thereafter drawing the yarn to at least twice its extruded length, without an intervening packaging step. Yarn so prepared will have a luster that makes it interchangeable with standard split process semi-dull (0.3% $TiO_2$) nylon yarn. The split-process, semi-dull nylon yarn is prepared by (1) adding about 0.3% weight percent $TiO_2$ to partially polymerized polyhexamethylene adipamide, (2) extruding the molten polyhexamethylene adipamide from a spinneret to form a yarn having at least one round filament, (3) quenching the molten filament in air, (4) steaming and packaging the formed yarn, and (5) drawing the packaged yarn at least twice its extruded length in a subsequent separate operation.

The invention will be more readily understood by reference to the illustrations.

Figure 1:
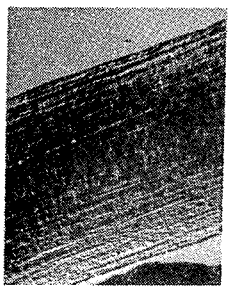
FIGURES 1 and 2 are electron photomicrographs of the surfaces of split-process yarns (FIGURE 1) and coupled process yarns (FIGURE 2) at various and comparable $TiO_2$ levels and at various magnifications.
Figure 1:
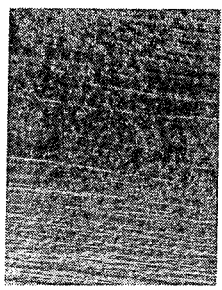
Figure 1:
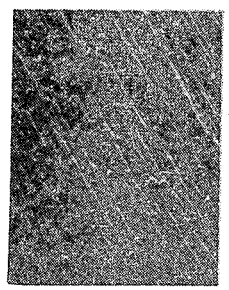
Figure 1:
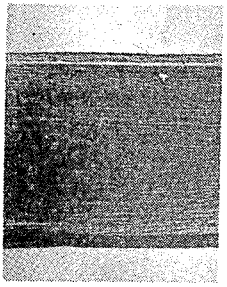
Figure 1:
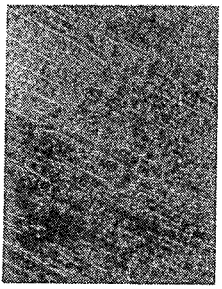
Figure 1:
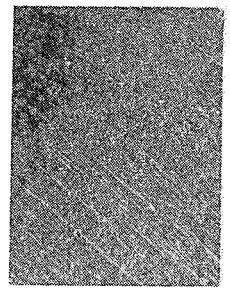
Figure 1:
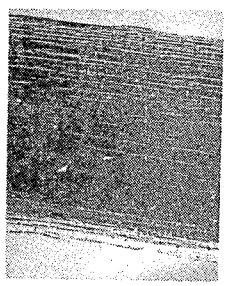
Figure 1:
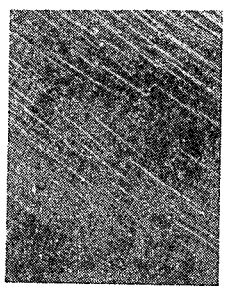
Figure 1:
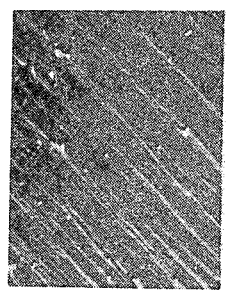
Figure 1:
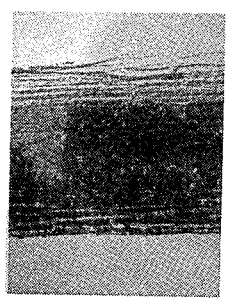
Figure 1:
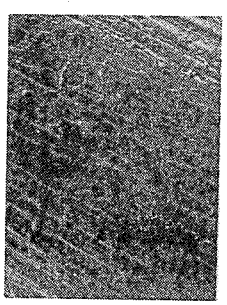
Figure 1:
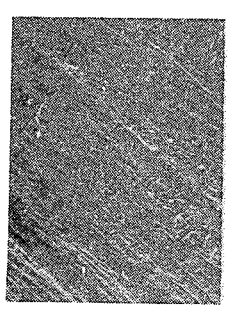
Figure 2:
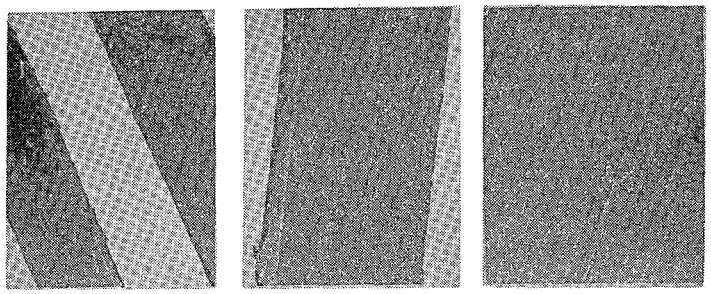
Figure 2:
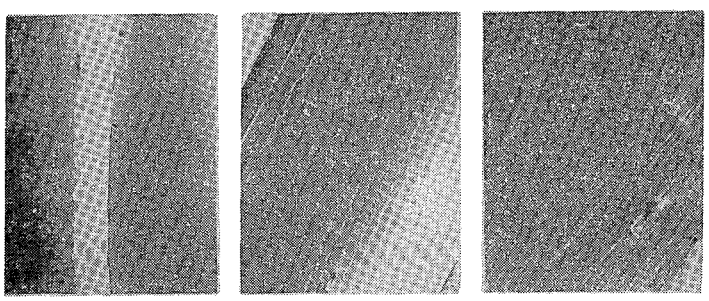
Figure 2:
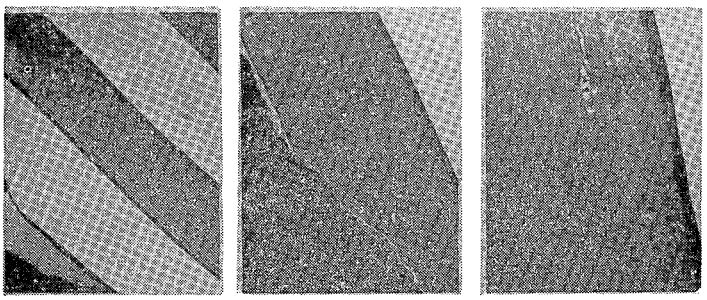
Figure 2:
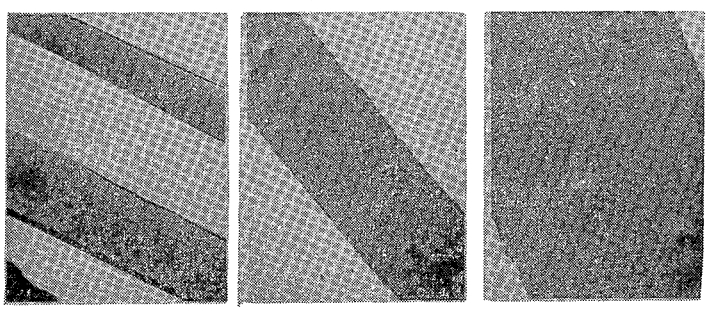

Exhaustive tests have been conducted to determine what fundamental difference in the coupled-process yarn versus the split-process yarn could account for the increase in fabric streakiness. The electron photomicrographs of FIGURES 1 and 2 reveal that the surface of the split-process yarn has numerous longitudinal striations whereas the coupled-process yarn is substantially free from such striations. Presumably as a result of this difference in surface characteristics, coupled-process yarn can tolerate from 0.5 to 0.75% $TiO_2$ and still remain mergible with split-process yarn in the semi-dull category (0.3% $TiO_2$).

Numerical values proportional to the surface roughness of single fibers may be obtained by optical methods. This technique provides a quantitative method for distinguishing the filaments of this invention, prepared by coupled-process spinning and drawing, from commercial 0.3% $TiO_2$ split-process yarn. Such coupled-process filaments of 0.5 to 0.75% $TiO_2$ will have a surface substantially free from longitudinal striations and a roughness factor (defined hereinafter) less than half the roughness factor of the said split process yarn. Generally, the roughness factor of the yarn of this invention will be less than about 0.5.

The increased amount of $TiO_2$ "tolerated" by the coupled-process yarns permits the production of fabric of decreased streakiness by decreasing yarn friction and increasing yarn covering power.

Throughout the specification and appended claims, the term "yarn" is meant to include both mono-filament and multi-filament yarn.

Percentages are by weight, unless otherwise indicated.

Figure 3:
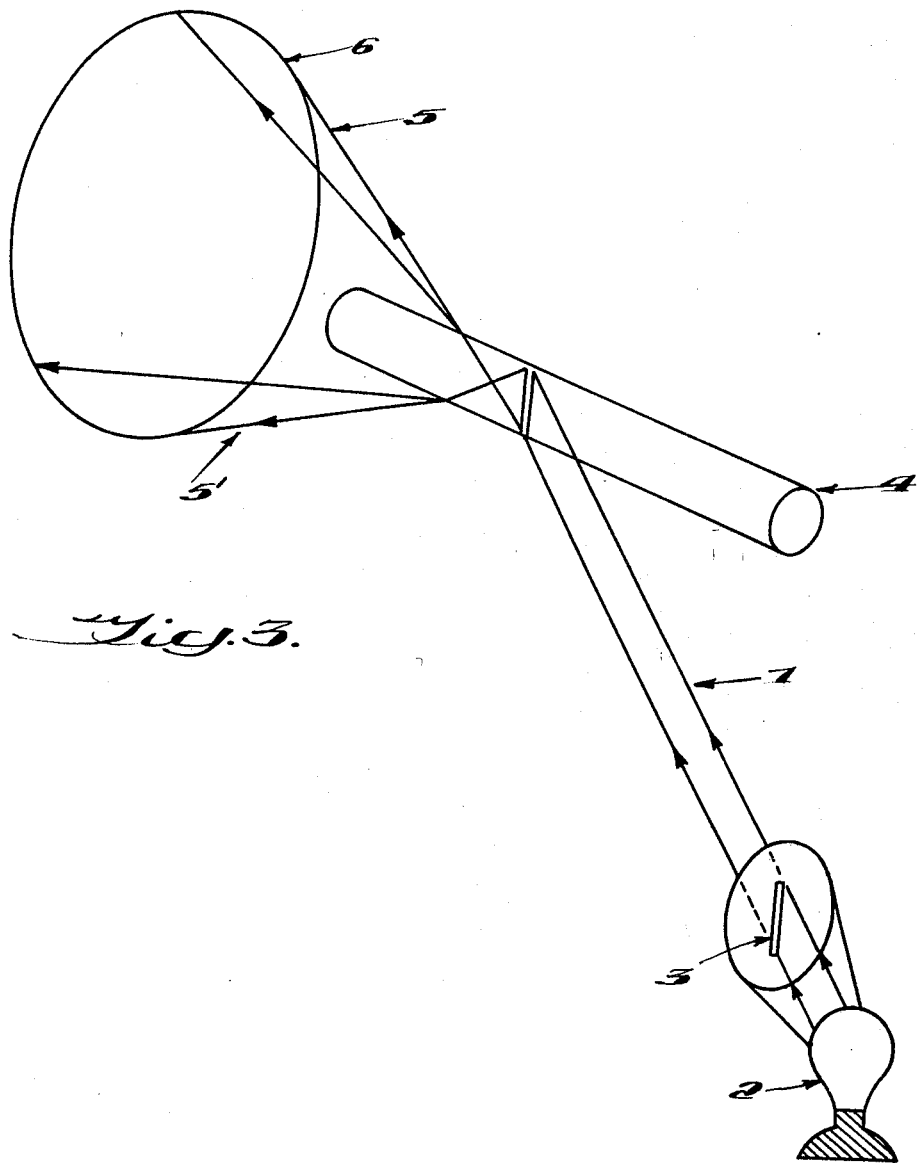
FIGURE 3 is a schematic of the optical arrangement employed to measure yarn roughness.

Yarn roughness is measured numerically using single filaments of the yarn in question. The filament is coated with aluminum on the side to be exposed to an incident light beam, using vacuum coating techniques, thus producing a mirror surface which follows faithfully the surface irregularities. The optical arrangement is shown schematically in FIGURE 3. An intense pencil-like beam of parallel light 1, approximately four or five times the fiber diameter, emanating from light source 2 and passing through aperture 3, is directed upon the fiber 4 at an incident angle of 45°. The reflected light 5, 5 from the side of the fiber forms a circular pattern 6. A photographic film is placed at 6 so that the circular pattern is focused on it, thus making a record of the pattern. Under this arrangement, a smooth filament produces a sharp circular pattern, since all the reflected rays reinforce each other. A filament having a bumpy or irregular surface produces a broad ring consisting of many lines and arcs of circles due to irregular reflection of the incident rays.

To characterize the surface roughness numerically, a microdensitometer trace of the film, in the direction radial to the circle, is prepared. The rougher the fiber surface, the broader is the circular pattern, and the more peaks are observed in the densitometer trace. Two parameters are taken from the densitometer trace to form a "roughness factor," $a$ the band width (in cm.) of the trace and $b$ the number of peaks greater than 0.1. Peaks of a height less than 0.1 are due to the grain size of the film, as shown by the densitometer trace where there is no reflection pattern on the film.

Fiber roughness is characterized by a factor combining the two measurements, which is equal to $a/b$. Using this procedure, a sample of split-process yarn having a 0.3% by weight $TiO_2$ has a roughness factor of 1.44. In comparison, the coupled-process yarn of the invention, having 0.5% by weight $TiO_2$, has a roughness factor of 0.48, or a roughness of only one-third that of the split process yarn.

The following examples are cited to illustrate, but not to limit the scope of, this invention. When used herein, relative viscosity measurements are obtained according to the procedure described in U.S. Patent No. 2,385,890. In each of the examples the polyhexamethylene adipamide is prepared following the technique of Heckert U.S. 2,689,839 dated Sept. 21, 1954, the $TiO_2$ being added during that phase of the polymerization cycle when partially polymerized reactants still contain from about 5% to about 20% by weight water.

*Example 1*

This example demonstrates the improved interlace efficiency obtained with the yarns of this invention.

Thirty-four filament yarn, in which the individual filaments are round in cross-section, is spun from poly-(hexamethylene adipamide) of about 38 relative viscosity, quenched without steaming, then immediately and continuously drawn at a ratio of 3.7 to a final denier of 70. Different batches contain different amounts of $TiO_2$, added during polymerization of the nylon. Between the last draw roll and the windup is positioned an interlacing jet of the type shown in FIG. 14 of U.S. Patent No. 2,985,995, in which the "interlace" process is disclosed. "Interlace" is a "twist" substitute for coupled-process yarn necessitated by the high spinning speeds used in the coupled-process. The interlacing jet is operated at air pressures of 25, 30 and 35 p.s.i.g.

For purposes of characterization and comparison, a sample length of each yarn is moved over a precision ground edge, under a "feeler" which is responsive to motion caused by variation in thickness of the yarn passing under it. The motion is amplified and recorded on a strip chart. The recording equipment is set to integrate yarn lengths which have a thickness exceeding approximately twice the diameter of the individual filaments. From this data, the percent interlace is calculated by dividing the total length of yarn exceeding the minimum thickness by the total length of yarn examined multiplied by one hundred. Results are reported in Table I.

TABLE I

| Percent $TiO_2$ | Percent Interlace Air pressure in jet, p.s.i.g. | | |
|---|---|---|---|
| | 25 | 30 | 35 |
| 0.3 | 0.8 | 1.3 | 2.8 |
| 0.5 | 1.1 | 1.9 | 5.1 |
| 0.75 | 1.8 | 2.9 | 5.2 |

*Example 2*

This example demonstrates the increased tolerance of coupled-process nylon yarn of semi-dull luster for titanium dioxide.

A series of fabrics is prepared using coupled-process unsteamed yarn having a $TiO_2$ content of 0.02, 0.30, 0.50, 0.75 and 0.90%, based on the weight of the yarn. Each of these yarns is woven as warp (with 5 t.p.i. twist) and as filling (zero twist) in fabric having 126 warp ends × 81 filling ends per inch. The fabrics are scoured and ironed. Each fabric is compared by a panel of nine fabric judges with a standard fabric made from split-process, steamed, semi-dull yarn having 0.3% $TiO_2$ content. Each judge decides which fabrics he would consider "mergible" with the standard fabric. The ranges established by all the judges are averaged. The resulting average shows that the visual tolerance to $TiO_2$ concentration observed is 0.40 to 0.75% $TiO_2$ when judged on the basis of opacity; and 0.35 to 0.70% $TiO_2$ when judged on the basis of luster.

Similar judging comparisons with the same standard fabric, using a series of fabrics woven from split-process yarn shows that the allowable $TiO_2$ content range for semi-dull luster and opacity is from 0.21 to 0.52% $TiO_2$.

*Example 3*

This example demonstrates the reduction in quill barré with an increase in $TiO_2$ content within the allowable limits for coupled-process yarn of semi-dull luster and opacity.

Coupled-process yarns of zero twist, containing four levels of $TiO_2$, are used as filling yarns in fabric of 104 sley × 76 pick construction. After dyeing with C.I. Acid Blue 78, the fabrics are rated for filling streaks, with the results shown in Table II.

TABLE II

| Sample | Quilling Tension, gms. | Percent $TiO_2$ in 66-Nylon Polymer | Rating* of Fabric Quill Barré |
|---|---|---|---|
| 1 | 35 | 0.3 | 20 |
| 2 | 35 | 0.5 | 18 |
| 3 | 35 | 0.7 | 14 |

*Fabric Rating:
0=None.
5=Faint.
10=Slight.
15=Moderate.
20=Severe.

Polyamides useful in practicing the instant invention are those obtained by polycondensation of monoamino-monocarboxylic acids or their amide forming derivatives, or equimolar amounts of a diamine and a dicarboxylic acid. Typical examples of the first group are polycaprolactam and polyundecanoamide; typical of the second group are poly(hexamethylene adipamide), poly(hexamethylene sebacamide), poly(m-xylylene adipamide), poly(hexamethylene isophthalamide) and the like. Copolymers of these and other polyamides are also included. The polyamides may also contain conventional additives such as antioxidants, dyestuffs, antistatic agents, heat stabilizers, UV screeners and the like.

The technique of polymer preparation is not critical provided the $TiO_2$ is added to the melt of the partially polymerized reactants in the presence of water. In addition to the Heckert technique used in preparing the delustered polymer of the examples above, other techniques, such as the autoclave methods of Maple, 3,002,-947, dated Oct. 3, 1961, or Van Oot 2,887,462, dated May 19, 1959, are also suitable.

Many equivalent modifications of the invention described herein will be apparent to those skilled in the art without a departure from the inventive concept.

What is claimed is:

1. A process for preparing a semi-dull nylon yarn having at least one filament of round cross-section which comprises, in order, the steps of (1) adding from about 0.5 to about 0.75 weight percent $TiO_2$ to partially polymerized polyhexamethylene adipamide, (2) after polymerizing the said polyhexamethylene adipamide to fiber-forming molecular weight, extruding the molten polymer from a spinneret to form a yarn having at least one filament of round cross-section, (3) quenching the molten filament by exposure to air, and (4) substantially immediately thereafter drawing the yarn to at least twice its extruded length and jet interlacing the said yarn.

2. The process of claim 1 wherein the weight percent $TiO_2$ is 0.5.

3. The process of claim 1 wherein the weight percent of $TiO_2$ is 0.75.

4. The semi-dull nylon yarn formed by the process of claim 1.

References Cited by the Examiner

UNITED STATES PATENTS 2,924,503  2/1960  Reese _____ 264—211 X

FOREIGN PATENTS 504,714  4/1939  Great Britain.

ALEXANDER H. BRODMERKEL, *Primary Examiner.*

D. J. ARNOLD, F. S. WHISENHUNT, JR.,
*Assistant Examiners.*